(12) United States Patent
Andre et al.

(10) Patent No.: US 7,702,864 B2
(45) Date of Patent: Apr. 20, 2010

(54) APPARATUS, SYSTEM, AND METHOD FOR WRITING STRIPES IN PARALLEL TO UNIQUE PERSISTENT STORAGE DEVICES

(75) Inventors: Herve Gilbert Philippe Andre, Tucson, AZ (US); Michael Thomas Benhase, Tucson, AZ (US); Yu-Cheng Hsu, Tucson, AZ (US); David Frank Mannenbach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 10/991,940

(22) Filed: Nov. 18, 2004

(65) Prior Publication Data

US 2006/0107005 A1    May 18, 2006

(51) Int. Cl.
*G06F 12/00* (2006.01)
(52) U.S. Cl. .................. 711/162; 711/114; 711/113; 711/E12.103
(58) Field of Classification Search .............. 711/114
See application file for complete search history.

(56) References Cited

U.S. PATENT DOCUMENTS

| | | | |
|---|---|---|---|
| 6,516,343 B1 | 2/2003 | Pong et al. | 709/216 |
| 6,564,231 B1 | 5/2003 | Yamada et al. | 707/201 |
| 6,697,891 B2 * | 2/2004 | Emberty et al. | 710/65 |
| 7,076,606 B2 * | 7/2006 | Orsley | 711/114 |
| 2002/0199060 A1 | 12/2002 | Peters et al. | 711/114 |
| 2003/0061456 A1 | 3/2003 | Ofek et al. | 711/162 |
| 2003/0065898 A1 | 4/2003 | Flamma et al. | 711/165 |
| 2003/0145157 A1 | 7/2003 | Smullen et al. | 711/104 |
| 2004/0078534 A1 | 4/2004 | Scheid | 711/162 |

OTHER PUBLICATIONS

Bullock G., et al."Recovery of data pages after partial page writes", IBMTDB#AAA91A061934, TDB n3 Aug. 1991 p. 69-83.

* cited by examiner

*Primary Examiner*—Reginald G Bragdon
*Assistant Examiner*—Aracelis Ruiz
(74) *Attorney, Agent, or Firm*—Kunzler & McKenzie

(57) ABSTRACT

An apparatus, system, and method are disclosed for copying data from a volatile memory device to a plurality of persistent storage devices in response to a loss of primary power. The apparatus includes a section module, a stripe module, and a write module. The section module sections a data image of a write cache into a plurality of data blocks. The stripe module establishes a plurality of data stripes from the plurality of data blocks. The write module writes in parallel each of the plurality of data stripes to a corresponding plurality of unique, persistent data storage devices in response to a loss of line power to the write cache. Advantageously, the apparatus quickly copies the write data from the write cache to a persistent memory device in a relatively short period of time, decreasing the dependence on significant batteries to back up the volatile memory device.

33 Claims, 11 Drawing Sheets

APPARATUS, SYSTEM, AND METHOD FOR WRITING STRIPES IN PARALLEL TO UNIQUE PERSISTENT STORAGE DEVICES

BACKGROUND

1. Technological Field

This invention relates to data copy technologies and more particularly relates to facilitating a parallel stripe copy.

2. Background Technology

Write caches are often incorporated into computer systems to increase perceived performance of the computer system. By implementing a write cache, the computer system may store certain data in memory, for example, and later write the data from memory to disk or another persistent storage device. Unfortunately, it is possible to lose the write data in the write cache in a volatile memory, such as random access memory (RAM), if a power failure occurs before the write data is written to persistent storage.

Conventional caching technologies have resulted in various proposed solutions to avoid losing the write data in response to a power loss. In particular, one conventional technology provides secondary, backup power to the memory device. These memory devices are often referred to as battery-backed memory (BBM) devices. A battery may back up the memory device for a long time. For example, some BBM devices are able to maintain write data in the write cache for approximately 72 hours. However, BBM devices can be costly in terms of purchasing and installing these devices. Additionally, BBM devices can take up a relatively large amount of physical space that otherwise might be used for additional computing devices.

Other conventional technologies provide backup power to the write cache, memory, processor, and storage devices long enough store a copy of the write data to persistent storage. These conventional technologies may be categorized into two types of copy operations: serial copies and parallel, ordered copies.

Serial copies, in which two or more copies of the same data are created in persistent storage, are facilitated by making a first copy of the write data and then making a second copy of the write data. These copies may be written to the same or to different persistent storage devices, such as two separate disks. While the redundant copies are typically more secure than only a single copy, the serial nature of the copy operations require that the secondary power source back up the system for a longer period of time in order to make the second copy after the first copy is completed.

Parallel copies, in contrast, take advantage of approximately parallel processing within the processor or multiple processors. Parallel copies also result in redundant copies, but are potentially created more quickly than serial copies. Parallel copies write a first copy to a first disk and a second copy to a second disk at approximately the same time. However, if the backup power fails before the parallel copy operations are completed, the user may lose data at the end of the write cache, even though parallel copies of the beginning portion of the write data may be preserved. In other words, two copies of only part of the data may be stored in persistent storage, but the remaining portion of both copies may be lost.

From the foregoing discussion, it should be apparent that a need exists for an apparatus, system, and method for copying data that decreases the opportunity for data loss as a result of a loss of secondary power during the copy operation. Furthermore, a need exists for an apparatus, system, and method for copying data that decreases the length of time during which the system or system components require secondary power to copy the write data from the write cache to persistent storage. Beneficially, such an apparatus, system, and method would overcome the present challenges associated with conventional copy technologies.

SUMMARY

The several embodiments of the present invention have been developed in response to the present state of the art, and in particular, in response to the problems and needs in the art that have not yet been fully solved by currently available copy technologies. Accordingly, the present invention has been developed to provide an apparatus, system, and method for copying data that overcome many or all of the above-discussed shortcomings in the art.

The apparatus to copy data is provided with a logic unit containing a plurality of modules configured to functionally execute the necessary operations for writing a data copy to persistent storage. These modules in the described embodiments include a section module, a stripe module, and a write module. In another embodiment, these modules also include a map module, a progress module, a trigger module, a restore module, a base module, and a supplemental module. In a further embodiment, these modules also include a forward module and a backward module.

In one embodiment, the apparatus includes a section module, a stripe module, and a write module. The section module sections a data image of a write cache into a plurality of data blocks. The stripe module establishes a plurality of data stripes from the plurality of data blocks. The write module writes in parallel each of the plurality of data stripes to a corresponding plurality of unique, persistent data storage devices in response to a loss of line power to the write cache.

In one embodiment, the section module sections a data image of the write data in the write cache into a plurality of data blocks. Alternatively, the section module may section a data image of the redundant write data in the redundant write cache into a plurality of data blocks. The size of the data blocks into which the section module sections the data image may be uniform or variable over the length of the data image. The data blocks may have known starting locations and block sizes or ending locations.

In one embodiment, the stripe module establishes a plurality of data stripes from the plurality of data blocks. The data stripes may be of uniform or variable size. In one embodiment, the data blocks are grouped into data block groups, also referred to as data stripes. In one embodiment, the number of data stripes is determined by the number of persistent storage devices. Alternatively, the number of persistent storage devices may be less than the number of data stripes, thereby allowing multiple stripes to be written to a single persistent storage device.

In one embodiment, the write module writes in parallel each of the plurality of data stripes to a corresponding plurality of unique, persistent data storage devices in response to a loss of line power to the write cache. In other words, the write module writes each of the data stripes to a unique persistent storage device after primary power fails and before secondary power fails.

In a further embodiment, the write module may continue to write the data stripes to the persistent storage devices until all of the data stripes have been written to each of the persistent storage devices, providing a number of full copies of the write data equal to the number persistent data storage devices. However, if secondary (backup) power fails before the full copies are written to the persistent storage devices, at least partial copies (as many of the stripes that were fully or partially written) should be stored on the various persistent storage devices. In certain embodiments, the write module may employ the forward module or the backward module to write the write data or the redundant write data.

In one embodiment, the map module maps the data image to each of the persistent data storage devices. The data image may be mapped to a contiguous block of space or, alternatively, to a plurality of non-contiguous blocks, on a persistent storage device. If the persistent data storage devices are identical, it may be sufficient to provide a single mapping to be used for the identical persistent storage devices.

In one embodiment, the progress module manages a progress code to track progress of the parallel data stripe write operation. In certain embodiments, the progress code may include several attribute fields that describe the data image and the status of the write operation at a given time. In one embodiment, the progress module periodically updates the progress code(s) throughout the copy operation. Additionally, the progress module may store the progress code(s) in a persistent storage device so that they are available in the event that primary and secondary power is lost.

In one embodiment, the trigger module recognizes a trigger event that initiates the parallel stripe copy operations described above. One example of a trigger event is the loss of line power to the write cache. Alternatively, the trigger event may be another type of power or data signal that potentially affects the volatility and/or the time available for writing the write data to persistent storage.

In one embodiment, the restore module reads the data stripes from the plurality of data storage devices and restores the write data to the write cache. Alternatively, the restore module reads the data stripes from the plurality of data storage devices and restores the redundant write data to the redundant write cache. In another embodiment, the restore module restores as much of the data image as possible, even if only partial data is available for a specific data stripe or data block.

In one embodiment, the base module designates one of the data stripes as a base stripe associated with a corresponding data copy. Similarly, the supplemental module designates all of the data stripes, except for the base stripe, as supplemental stripes for the data copy corresponding to the base stripe. The write module, in one embodiment, is configured to write the base stripe to the persistent storage device first and the supplemental stripes after the base stripe.

Another embodiment of an apparatus to copy data is also presented. This apparatus includes a stripe module and a write module. The stripe module establishes a first data stripe and a second data stripe from a data image of a write cache. The write module writes the first data stripe to a first data storage device and the second data stripe to a second data storage device. Subsequently, the write module writes the second data stripe to the first data storage device and the first data stripe to the second data storage device. In a further embodiment, the first data copy may be written in a forward direction and the second data copy may be written in a backward direction.

A system of the present invention is also presented to copy data. In one embodiment, the system may be embodied in a storage area network (SAN) system having a plurality of data storage devices, a storage controller, a write cache, and a copy apparatus. The copy apparatus, in one embodiment, is coupled to the storage controller and writes a plurality of copies of the write data in parallel to the plurality of data storage devices in response to a loss of power to the storage controller. Furthermore, the copy apparatus writes each copy in a unique striped order with respect to the other copies.

A signal bearing medium is also presented to store a program that, when executed, performs one or more operations to copy data. In one embodiment, the operations include sectioning a data image of a write cache into a plurality of data blocks, establishing a plurality of data stripes from the plurality of data blocks, and writing in parallel each of the plurality of data stripes to a corresponding plurality of unique, persistent data storage devices in response to a loss of line power to the write cache.

In another embodiment, the operations also may include writing all of the data stripes to each of the data storage devices to produce a plurality of data copies equal to the number of data stripes, designating one of the data stripes as a base stripe associated with a corresponding data copy, designating all of the data stripes, except for the base stripe, as supplemental stripes for the data copy corresponding to the base stripe, and/or writing the base stripe and, subsequently, the supplemental stripes to one of the unique data storage devices.

In another embodiment, the operations also may include mapping the data image to each of the plurality of data storage devices, managing a progress code to track progress of the parallel data stripe write, writing one of the plurality of data stripes to one of the plurality of data storage devices in a forward direction, and/or writing one of the plurality of data stripes to one of the plurality of data storage devices in a backward direction. In another embodiment, the operations also may include recognizing the loss of line power to the write cache. In another embodiment, the operations also may include reading the data stripes from the plurality of data storage devices and restoring the write data to the write cache.

A method is also presented for deploying a computing infrastructure. The computing infrastructure includes computer-readable code integrated into a computing system. In one embodiment, the computer-readable code, in combination with the computing system, is capable of copying data. In particular, the method in the disclosed embodiments substantially includes deploying code that enables the operations necessary to carry out the functions presented above with respect to the operation of the described apparatus and system. Furthermore, some or all of the operations of the code may be substantially similar to the operations that are performed when the program on the signal bearing medium is executed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 1:
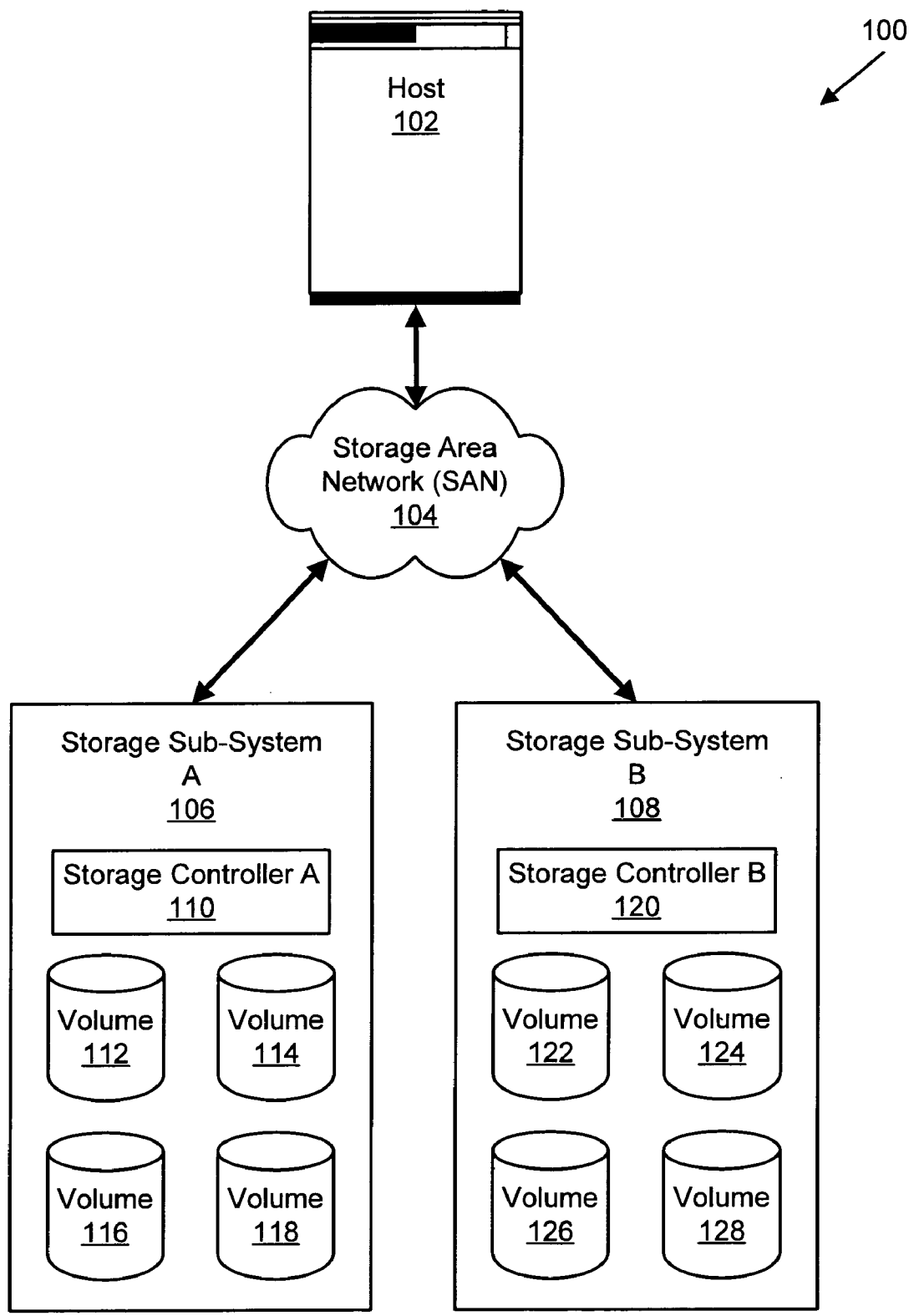
FIG. 1 is a schematic block diagram illustrating one embodiment of a storage area network (SAN) system.

FIG. 1 depicts one embodiment of a storage area network (SAN) system 100. The illustrated SAN system 100 includes a host 102 connected to a SAN 104. The SAN system 100 also includes a storage sub-system A 106 and a storage sub-system B 108. In one embodiment, the host 102 may communicate with the storage sub-system A 106 and/or the storage sub-system B 108 via the SAN 104. Similarly, the storage sub-system A 106 may communicate with the storage sub-system B 108 via the SAN 104. Alternatively, the storage sub-system A 106 may communicate directly with the storage sub-system B 108 via a direct communication channel (not shown).

In further embodiments, the SAN system 100 may include more than one host 102 and/or more than two storage sub-systems 106, 108. Where more than one host 102 is connected to the SAN 104, each host 102 may correspond to one or more of the storage sub-systems 106, 108. For example, in one embodiment, the host 102 may be configured to communicate only with the storage sub-system A 106, but not with the storage sub-system B 108.

The storage sub-system A 106, in one embodiment, includes a storage controller A 110 and a plurality of volumes 112-118. An example of the storage controller A 110 is described in more detail with reference to FIG. 2. The volumes 112-118 may represent physical storage devices, such as hard disk drives (HDDs), within the storage sub-system A 106. Alternatively, the volumes 112-118 may represent logical volumes that are mapped to certain physical storage devices within the storage sub-system A 106. The storage sub-system B 108 is similar to the storage sub-system A 106 in that it includes a storage controller B 120 and a plurality of volumes 122-128. The storage controller B 120 and the volumes 122-128 of the storage sub-system B 108 may be substantially similar to the storage controller A 110 and the volumes 112-118 of the storage sub-system A 106.

Figure 2:
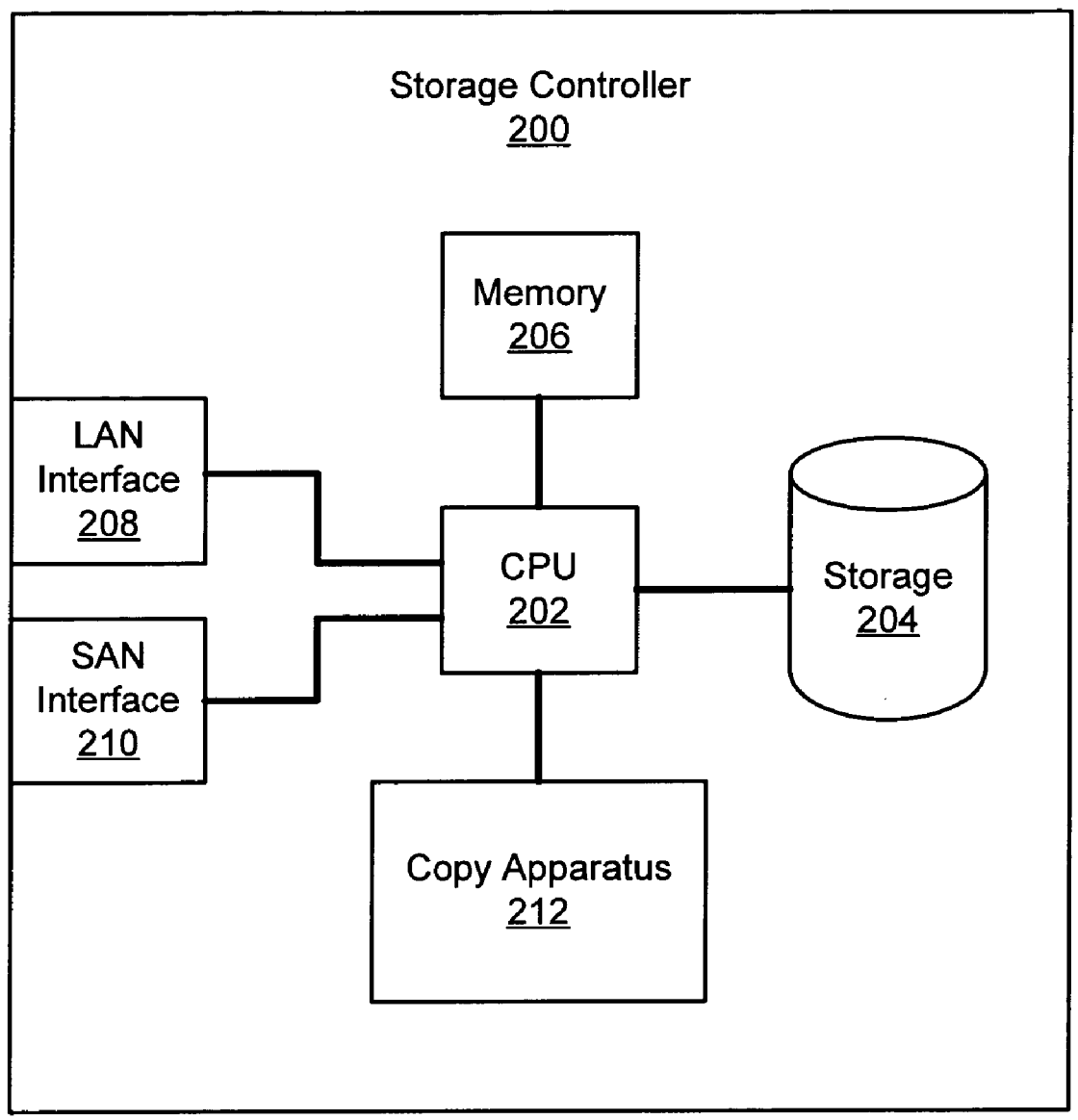
FIG. 2 is a schematic block diagram illustrating one embodiment of a storage controller within a storage sub-system of the SAN system.

FIG. 2 depicts one embodiment of a storage controller 200 that may be substantially similar to the storage controller A 110 and the storage controller B 120 of FIG. 1. The illustrated storage controller 200 includes a central processing unit (CPU) 202, an electronic storage device 204, an electronic memory device 206, one or more network interface devices 208, 210, and a copy apparatus 212. In one embodiment, the storage controller 200 includes a local area network (LAN) interface 208 and a storage area network (SAN) interface 210.

In one embodiment, the CPU 202 is configured to process data requests, operations, and commands to manage the storage controller 200. The electronic storage device 204 is configured, in one embodiment, to electronically store data that is related to the management and operation of the storage controller 200. In one embodiment, the electronic storage device 204 may be persistent memory or another type of persistent data storage. Similarly, the electronic memory device 206 is configured, in one embodiment, to electronically store data that may be used for management and operation of the storage controller 200 and/or application programs that may be executed on the storage controller 200. One example of the electronic memory device 206 is described in more detail with reference to FIG. 3.

The LAN interface device 208, in one embodiment, allows communications to occur between the storage controller 200 and one or more devices, such as the host 102 connected to a LAN (not shown). Similarly, the SAN interface 210 allows communications to occur between the storage controller 200 and other devices connected to the SAN 104. Alternatively, the SAN interface device 210 may allow communications between, for example, the storage controller A 110 and the storage controller B 120.

Figure 3:
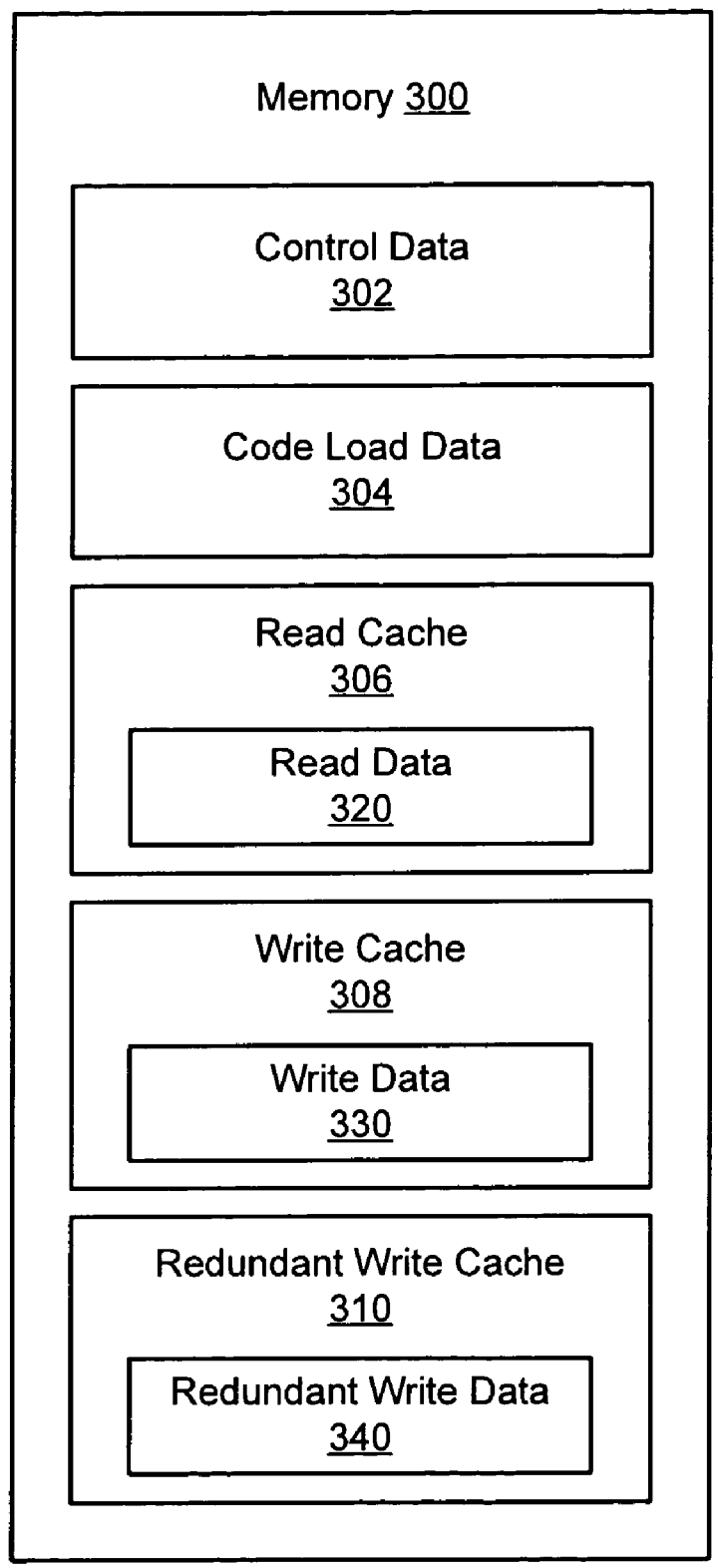
FIG. 3 is a schematic block diagram illustrating one embodiment of an electronic memory device coupled to the storage controller.

FIG. 3 depicts one embodiment of an electronic memory device 300 that may be substantially similar to the electronic memory device 206 shown in FIG. 2. The memory 300 generally stores data and/or metadata that may be used to manage the operations of the storage controller 200. In one embodiment, the memory 300 is volatile memory. Alternatively, the memory 300 may be non-volatile memory, such as non-volatile random access memory (NVRAM) or a similar memory device.

The illustrated memory 300 is configured to store various types of data in several partitions. For example, the memory 300 may store control data 302 and code load data 304. The memory 300 also may have a reserved space for a read cache 306 and a write cache 308. In a further embodiment, the memory 300 also may reserve space for a redundant write cache 310 that may be substantially similar to the write cache 308.

In one embodiment, the read cache 306 stores read data 320 that is read from any of the volumes 112-118 within a given storage sub-system 106. The read data 320 may be stored in the read cache 306 and subsequently sent to a host 102, for example, or another device within the SAN system 100. Similarly, the write cache 308 and the redundant write cache 310 store write data 330 and redundant write data 340, respectively, that is to be written to one or more of the volumes 112-118 within the SAN system 100.

When the memory 300 is volatile and there is a loss of line power to the memory device 300, generally, and to the write cache 308, specifically, as well as the CPU 202, it is useful to perform a time sensitive copy operation to quickly copy the write data 330 to one or more persistent storage devices, such as the volumes 112-118, within a given storage sub-system 106. The copy apparatus 212 may facilitate this such a copy operation to copy the write data 330 and/or the redundant write data 340 to one or more persistent storage devices.

Figure 4:
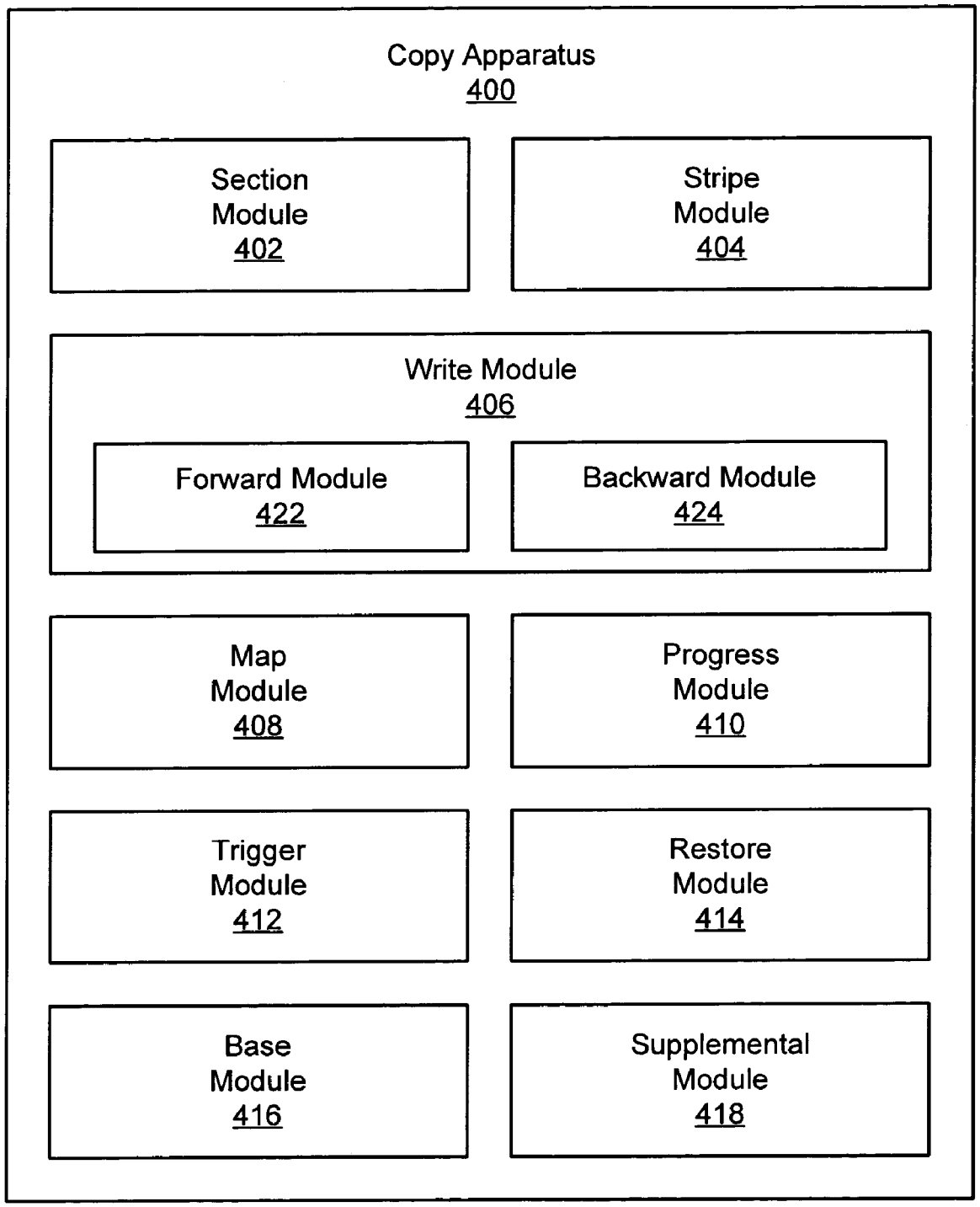
FIG. 4 is a schematic block diagram illustrating one embodiment of a copy apparatus.

FIG. 4 depicts one embodiment of a copy apparatus 400 the may be substantially similar to the copy apparatus 212 of FIG. 2. The copy apparatus 400 is configured, in one embodiment, to manage a copy operation associated with the storage sub-system on which the storage controller 200 is located. More specifically, the copy apparatus 400 may facilitate a copy operation to quickly copy the write data 330 and/or the redundant write data 340 from the volatile memory 300 in response to a loss of line power to the write cache 308 and/or the redundant write cache 310.

The illustrated copy apparatus 400 includes a section module 402, a stripe module 404, and a write module 406. The illustrated copy apparatus 400 also includes a map module 408, a progress module 410, a trigger module 412, a restore module 414, a base module 416, and a supplemental module 418. In one embodiment, the write module 406 may further include a forward module 422 and a backward module 424. Although some description of these modules 402-424 is provided immediately below, further details of the functionality of these modules 402-424 also may be understood with reference to description of the other figures and flow charts described herein.

In one embodiment, the section module 402 sections a data image of the write data 330 in the write cache 308 into a plurality of data blocks. Alternatively, the section module 402 may section a data image of the redundant write data 340 in the redundant write cache 310 into a plurality of data blocks. The size of the data blocks into which the section module 402 sections the data image may be uniform or variable over the length of the data image. For example, in one embodiment, a data image having a total size of 1 gigabyte (GB) may be uniformly subdivided into data blocks of 32 megabytes (MB) each. The data blocks may have known starting locations and block sizes or ending locations. One example of a data image and data blocks is described in more detail with reference to FIG. 5A.

In one embodiment, the stripe module 404 establishes a plurality of data stripes from the plurality of data blocks. The data stripes may be of uniform or variable size. In one embodiment, the data blocks are grouped into data block groups, also referred to as data stripes. The number of stripes is related to the number of persistent storage devices to which the data image is to be written. In one embodiment, the number of data stripes is determined by the number of persistent storage devices. For example, the number of data stripes and persistent storage devices may be equal, providing a one-to-one ratio. Alternatively, the number of persistent storage devices may be less than the number of data stripes, thereby allowing multiple stripes to be written to a single persistent storage device.

In one embodiment, the write module 406 writes in parallel each of the plurality of data stripes to a corresponding plurality of unique, persistent data storage devices in response to a loss of line power to the write cache. In other words, the write module 406 writes each of the data stripes to a unique persistent storage device after primary power fails and before secondary power fails.

In a further embodiment, the write module 406 may continue to write the data stripes to the persistent storage devices until all of the data stripes have been written to each of the persistent storage devices, providing a number of full copies of the write data 330 equal to the number persistent data storage devices. However, if secondary (backup) power fails before the full copies are written to the persistent storage devices, at least partial copies (as many of the stripes that were fully or partially written) should be stored on the various persistent storage devices. In certain embodiments, the write module 406 may employ the forward module 422 or the backward module 424 to write the write data 330 or the redundant write data 340. Examples of forward and backward writing are described in more detail with reference to FIG. 5b.

In one embodiment, the map module 408 maps the data image to each of the persistent data storage devices. The data image may be mapped to a contiguous block of space or, alternatively, to a plurality of non-contiguous blocks, on a persistent storage device. If the persistent data storage devices are identical, it may be sufficient to provide a single mapping to be used for the identical persistent storage devices. However, the position that each data block of the data image takes on a persistent storage device may be known beforehand.

In one embodiment, the progress module 410 manages a progress code to track progress of the parallel data stripe write operation. The progress code, although not shown in the figures, may include several attribute fields that describe the data image and the status of the write operation at a given time. For example, some of the attribute fields may include: a total image size, a data block size, a total number of data blocks, a number to track the written data blocks, an identifier to indicate the next data block to be written, a target storage device identifier, a position of each block within the data image, a copy status indicator to indicate the copy status and disk position for a given data block, a copy completion Boolean, and so forth.

In another embodiment, multiple progress codes may be implemented and each progress code may contain some or all of the listed attribute fields. In a further embodiment, one or more progress codes may include other attribute fields that aid in tracking the status of a copy operation. In one embodiment, the progress module 410 periodically updates the progress code(s) throughout the copy operation. Additionally, the progress module 410 may store the progress code(s) in a persistent storage device so that they are available in the event that primary and secondary power is lost.

In one embodiment, the trigger module 412 recognizes a trigger event that initiates the parallel stripe copy operations described above. One example of a trigger event is the loss of line power to the write cache 308. Alternatively, the trigger event may be another type of power or data signal that potentially affects the volatility and/or the time available for writing the write data 330 to persistent storage.

In one embodiment, the restore module 414 reads the data stripes from the plurality of data storage devices and restores the write data 330 to the write cache 308. Alternatively, the restore module 414 reads the data stripes from the plurality of data storage devices and restores the redundant write data 340 to the redundant write cache 310. In another embodiment, the restore module 414 restores as much of the data image as possible, even if only partial data is available for a specific data stripe or data block. The restore module 414 may query the progress code(s) to determine which data may or may not be restored. One example of restoring data from the persistent storage devices is described in more detail with reference to FIG. 11.

In one embodiment, the base module 416 designates one of the data stripes as a base stripe associated with a corresponding data copy. Similarly, the supplemental module 418, in one embodiment, designates all of the data stripes, except for the base stripe, as supplemental stripes for the data copy corresponding to the base stripe. The write module 406, in one embodiment, is configured to write the base stripe to the persistent storage device first and the supplemental stripes after the base stripe. An example of base and supplemental stripes is described in more detail with reference to FIGS. 6A-C.

Figure 5A:
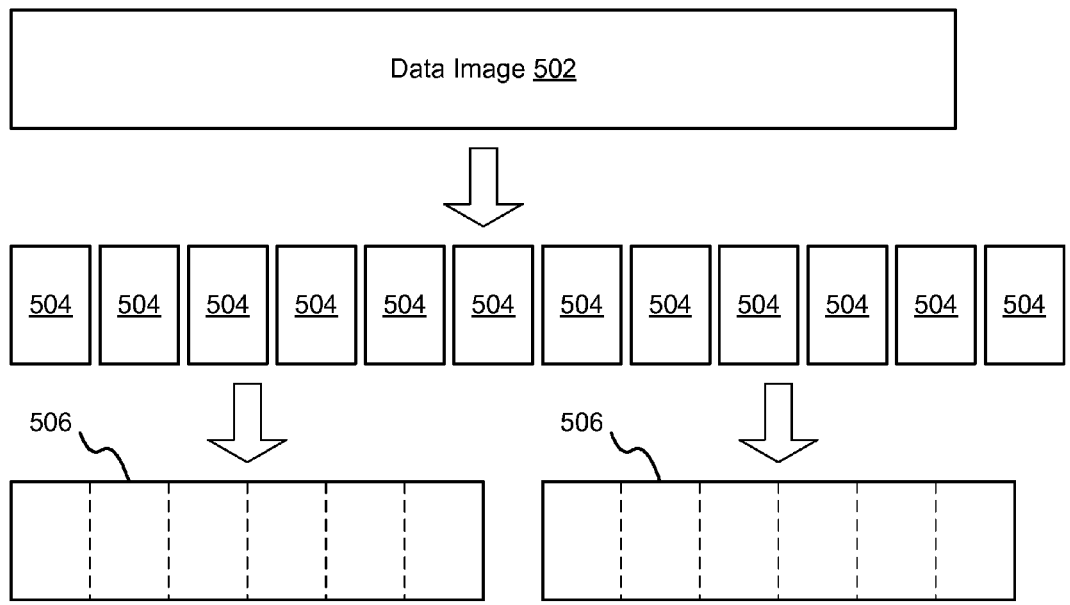
FIG. 5A is a schematic block diagram illustrating one embodiment of a data image, data blocks, and data stripes.

FIG. 5A depicts one embodiment of a data image 502 that is representative of write data 330 in a write cache 308 within the memory 300 of a storage controller 200. Alternatively, the data image 502 is representative of redundant write data 340 in a redundant write cache 310 of the cache 310 of the memory 300. As used herein, reference to the write cache 308 is intended to include additional or alternative reference to the redundant write cache 310, unless specified otherwise.

The illustrated data image 502 may be of any size that is substantially equivalent to the size of the write cache 308. For example, if the write cache 308 is approximate 1 GB, the data image 502 also may be approximately 1 GB in size. As explained above, the section module 402 may section the data image 502 into multiple data blocks 504 of approximately equal size. In the illustrated example, the data image 502 is subdivided into twelve data blocks 504. However, the section module 402 may section the data image 502 into fewer or more data blocks 504.

The stripe module 506 then may group the data blocks 504 into two or more block groups 506, which also may be referred to as data stripes 506. In one embodiment, each of the data stripes 506 comprises a unique subset of the plurality of data blocks 504. However, in an alternative embodiment, the data stripes 506 may include partially or wholly overlapping data blocks 504. In the illustrated example, the twelve data blocks 504 are grouped into two data stripes 506. Although the size of the data stripes 506 may be determined by the number of data blocks 504 within the data image 502, in alternative embodiments the size of the data stripes 506 may be determined by the total size of the data image 502 and the incremental size(s) of the data blocks 504.

Figure 5B:
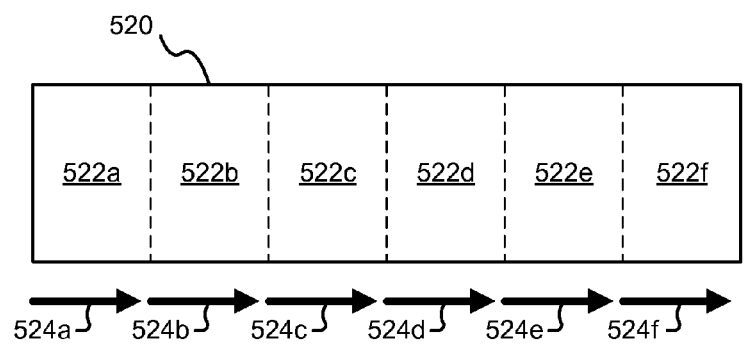
FIG. 5B is a schematic block diagram illustrating one embodiment of a read sequence for a data stripe.

FIG. 5B depicts one embodiment of a read sequence for a particular data stripe 520. The illustrated data stripe 520 includes a plurality of data blocks 522a-f, although alternative embodiments of the data stripe 520 may include fewer or more data blocks 522. In order to copy the data stripe 520 from the memory 300 to a persistent storage device, the write module 406 may individually read and write the data blocks 522. Although it may be possible to read data backwards, a conventional data read operation, in general, reads data in a forward direction. Therefore, the illustrated embodiment of a read sequence for a data stripe 520 is described with reference to forward reading of individual the data blocks 522. The forward reading of each of the data blocks 522a-f is depicted by a corresponding arrow 524a-f below each data block 522a-f. However, in alternative embodiments, it may be possible to read individual data blocks 522 in a backward direction.

With regard to the composite data stripe 520, it may be possible to read the data stripe 520 in either a forward or a backward direction. As described above, the write module 406 may employ the forward module 422 to read and write the data stripe 520 in a forward direction. Similarly, the write module 406 may employ the backward module 424 to read and write the data stripe 520 in a backward direction.

To read the data stripe 520 in a forward direction, the write module 406 may read the individual data blocks 522 starting with the first data block 522a at the beginning of the data stripe 520 and continuing to the last data block 522f at the end of the data stripe 520, in the following order:

522a→522b→522c→522d→522e→522f.

To read the data strip 520 in a backward direction, the write module 406 may read the individual data blocks 522 starting with the last data block 522f at the end of the data stripe 520 and continuing to the first data block 522a at the beginning of the data stripe 520, in the following order:

522f→522e→522d→522c→522b→522a.

Figure 6A:
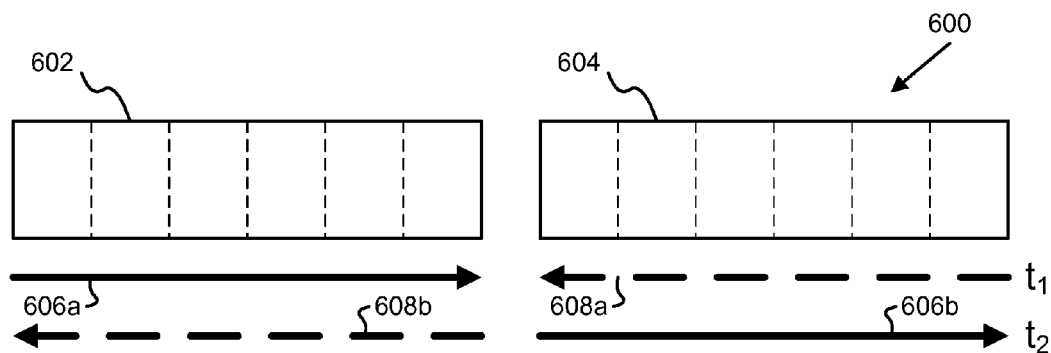
FIGS. 6A-C are schematic block diagrams illustrating several embodiments of data copy sequences for data stripes.

FIG. 6A depicts one example of a data copy sequence for a particular data image 600. The illustrated data image 600 is subdivided into two data stripes—a first data stripe 602 and a second data stripe 604. Before the write module 406 writes the data stripes 602, 604 to the corresponding two persistent storage devices, the base module 416 may designate base stripes and the supplemental module 418 may designate supplemental stripes for each copy of the data image 600. For each copy of the data image 600, the base module 416 may designate one base stripe and the supplemental module 418 may designate the remaining data stripes as supplemental stripes.

During a write operation for a single data copy to a single persistent storage device, the base stripe is written first and then the supplemental stripes are written. In one embodiment, the base stripe for all of the data copies are written in parallel to the corresponding persistent storage devices. Subsequently, the supplemental stripes are written in parallel to the corresponding persistent storage devices. Table 6.1 provides a stripe designation that corresponds to the data image 600 of FIG. 6A.

TABLE 6.1

Base and Supplemental Stripes for each Copy of a Data Image.

|  | Copy 1 | Copy 2 |
| --- | --- | --- |
| Stripe 602 | Base | Supplemental |
| Stripe 604 | Supplemental | Base |

In the illustrated embodiment with two data stripe 602, 604, two data copies may be written—a first data copy and a second data copy. In other words, at least two copies of the data image 600 will be made, where each copy is written to a unique, persistent storage device. The first data copy is indicated by the solid arrows 606a, 606b and the second data copy is indicated by the dashed arrows 608a, 608b. Furthermore, the read and write sequence for the parallel data copies is indicated by the times $t_1$ and $t_2$ along the right margin.

At time $t_1$, the write module 406 writes the first data stripe 602 (which is the base stripe for copy 1) to the first persistent storage device. In parallel, the write module 406 writes the second data stripe 604 (which is the base stripe for copy 2) to the second persistent storage device. Subsequently, at time $t_2$, the write module 406 writes the second data stripe 604 (which is a supplemental stripe for copy 1) to the first persistent storage device. In parallel, the write module 406 writes the first data stripe 602 (which is a supplemental stripe for copy 2) to the second persistent storage device. After the illustrated copy sequence, the first data copy resides on a first on a first persistent storage device and the second data copy resides on a second persistent storage device. Table 6.2 shows a timeline for the depicted copy sequence of FIG. 6A.

TABLE 6.2

Copy Sequence for First and Second Data Copies.

|  | Copy 1 | Copy 2 |
|---|---|---|
| Time $t_1$ | Base Stripe 602 | Base Stripe 604 |
| Time $t_2$ | Supplemental Stripe 604 | Supplemental Stripe 602 |

The order of the stripe reads and writes is also depicted in FIG. 6a. As shown, both of the data stripes 602, 604 for the first data copy are read and written in a forward direction, as indicated by the solid arrows 606a, 606b. In contrast, both of the data stripes 602, 604 for the second data copy are read and written in a backward direction, as indicated by the dashed arrows 608a, 608b. In other words, the first copy is a forward copy and the second copy is a backward copy, with reference to the order in which the data blocks of the data stripes 602, 604 are read and written. Table 6.3 lists the direction in which each of the data stripes 602, 604 is read and written for the depicted copy sequence of FIG. 6A.

TABLE 6.3

Copy Direction for Data Stripes.

|  | Copy 1 | Copy 2 |
|---|---|---|
| Stripe 602 | Forward | Backward |
| Stripe 604 | Forward | Backward |

Figure 6B:
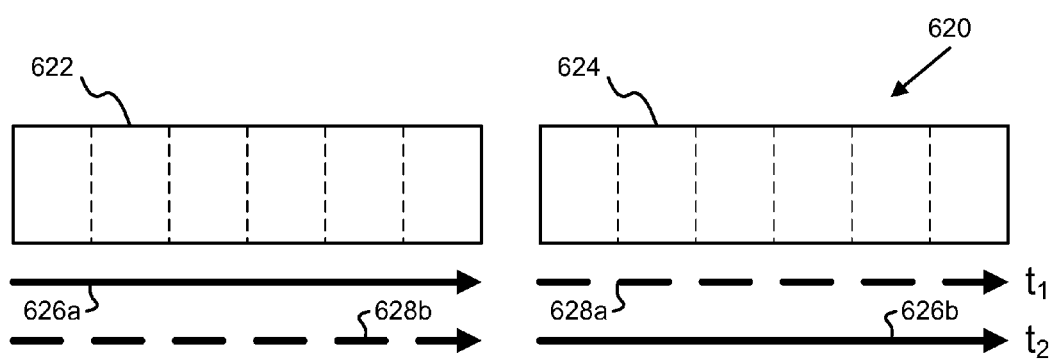

FIG. 6B depicts an alternative data copy sequence for a data image 620 that is substantially similar to the data image 600 of FIG. 6A. As illustrated and shown in Table 6.4, the first and second copies are both read and written in a forward direction. In alternative embodiments, other combinations of copy directions for various numbers of data stripes may be employed.

TABLE 6.4

Copy Direction for Data Stripes.

|  | Copy 1 | Copy 2 |
|---|---|---|
| Stripe 602 | Forward | Forward |
| Stripe 604 | Forward | Forward |

Figure 6C:
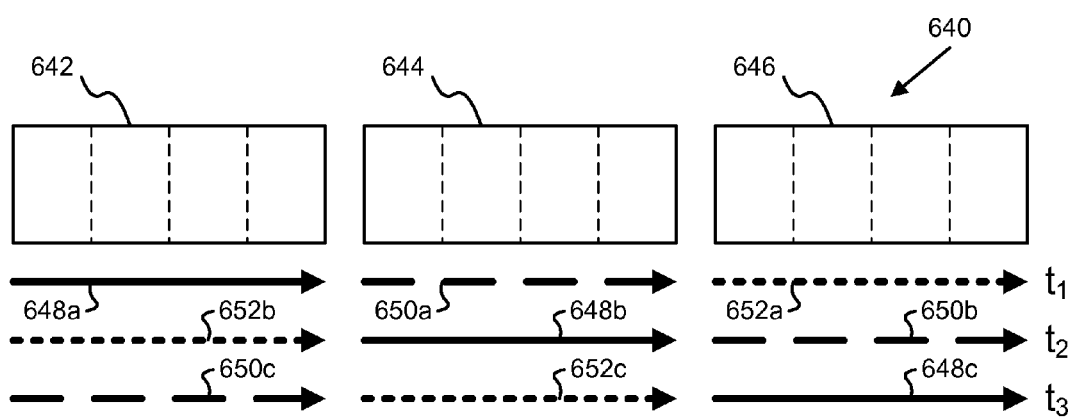

FIG. 6C depicts one example of a data copy sequence for a particular data image image 640 that is subdivided into three data stripes 642, 644, 646. In one embodiment, three data copies (indicated by the solid, dashed, and dotted arrows) may be written for the data image 640, according to the stripe designation, copy sequence, and copy direction shown in Tables 6.5, 6.6, and 6.7, respectively.

TABLE 6.5

Base and Supplemental Stripes for each Copy of a Data Image.

|  | Copy 1 | Copy 2 | Copy 3 |
|---|---|---|---|
| Stripe 642 | Base | Supplemental | Supplemental |
| Stripe 644 | Supplemental | Base | Supplemental |
| Stripe 646 | Supplemental | Supplemental | Base |

TABLE 6.6

Copy Sequence for First and Second Data Copies.

|  | Copy 1 | Copy 2 | Copy 3 |
|---|---|---|---|
| Time $t_1$ | Base Stripe 642 | Base Stripe 644 | Base Stripe 646 |
| Time $t_2$ | Supp. Stripe 644 | Supp. Stripe 646 | Supp. Stripe 642 |
| Time $t_3$ | Supp. Stripe 646 | Supp. Stripe 642 | Supp. Stripe 644 |

TABLE 6.7

Copy Direction for Data Stripes.

|  | Copy 1 | Copy 2 | Copy 3 |
|---|---|---|---|
| Stripe 642 | Forward | Forward | Forward |
| Stripe 644 | Forward | Forward | Forward |
| Stripe 646 | Forward | Forward | Forward |

Figure 7:
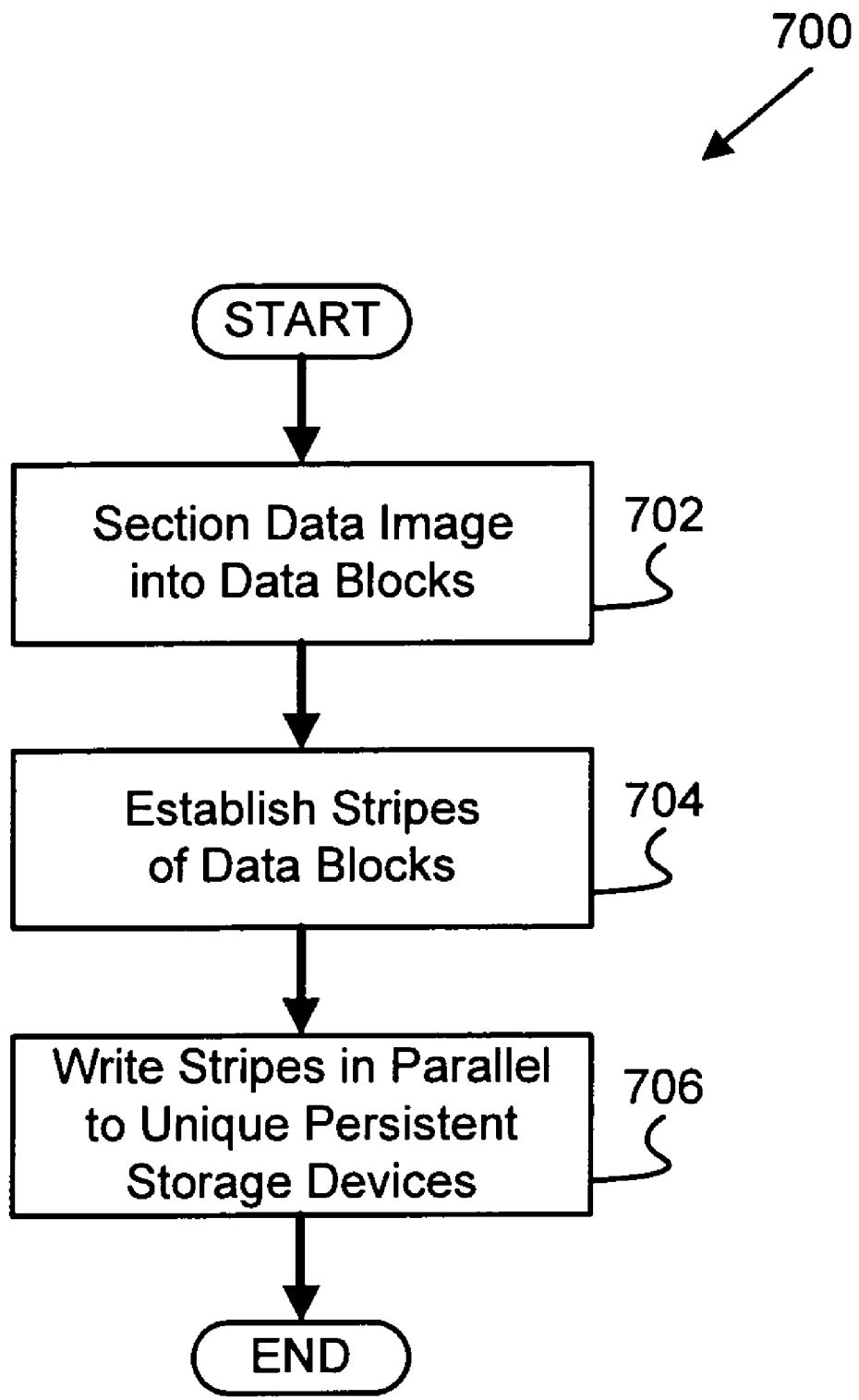
FIG. 7 is a schematic flow chart diagram illustrating one embodiment of a copy method.

FIG. 7 depicts one embodiment of a copy method 700 that may be facilitated by the copy apparatus 400 of FIG. 4. The illustrated copy method 700 may begin in response to a trigger event, such as a loss of line power to the storage controller 200. Alternatively, the copy method 700 may begin in response to another type of trigger event.

After the copy method 700 begins, the section module 402 sections 702 a data image 502 of the write cache 308 into a plurality of data blocks 504. The stripe module 404 then establishes 704 a plurality of data stripes 506 from the plurality of data blocks 504. Subsequently, the write module 406 writes 706 the data stripes 506 in parallel to a corresponding plurality of unique, persistent data storage devices. In an alternative embodiment, the sectioning 702 and the striping 704 may occur prior to the trigger event and the writing 706 may occur in response to the trigger event.

Figure 8:
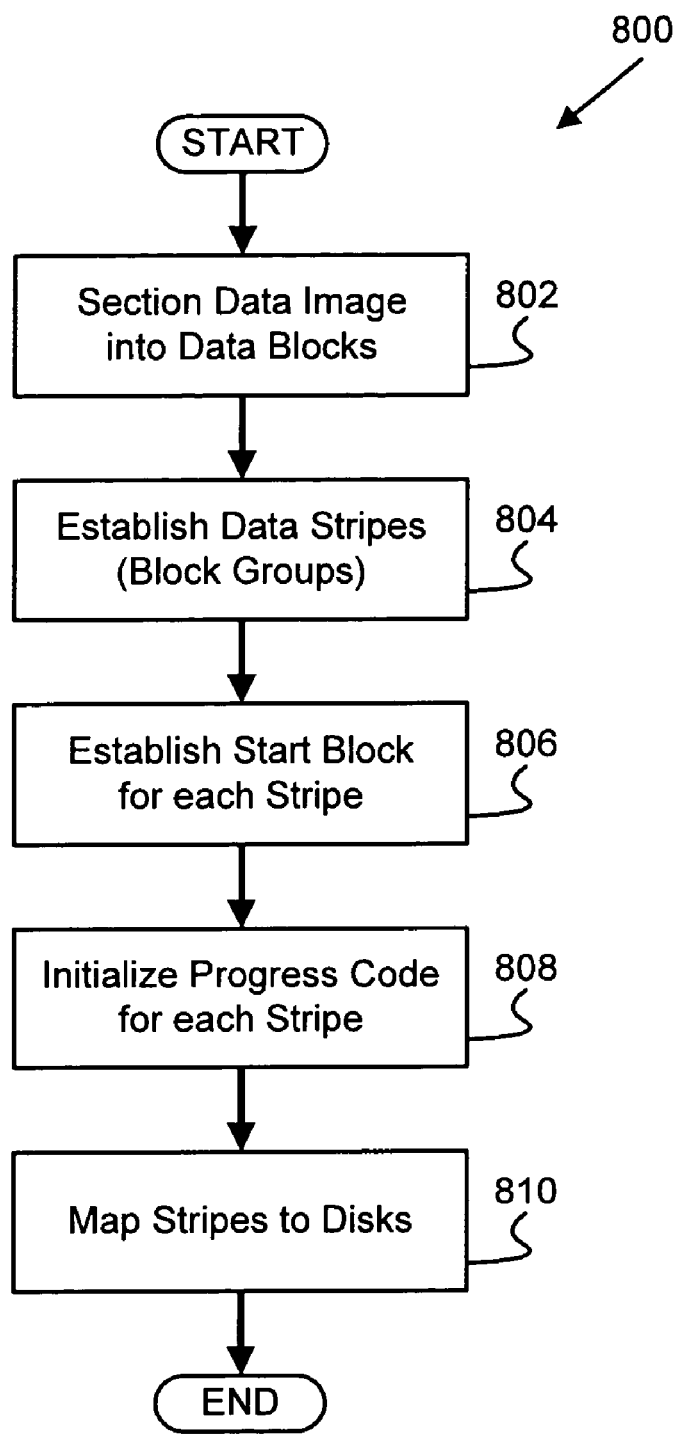
FIG. 8 is a schematic flow chart diagram illustrating one embodiment of a pre-copy method.

FIG. 8 depicts one embodiment of a pre-copy method 800 that is given by way of example of more detailed operations that may occur in conjunction with the copy method 700 of FIG. 7. The illustrated pre-copy method 800 begins and the section module 402 sections 802 the data image 502 into data blocks 504, as described above. The stripe module 404 then creates data stripes 506 that include the various data blocks 504. The sectioning operation 802 and striping operation 804 of the pre-copy method 800 may be substantially similar to the sectioning operation 702 and striping operation 704 of the copy method 700.

After establishing 804 the data stripes 506, the stripe module 404 then establishes 806 a start data block 504 for the each of the data stripes 506. In one embodiment, the stripe module 404 may employ the forward module 422 or the backward module 424 to establish 806 the start block 504 for a given data strip 506. Subsequently, the progress module 410 initializes 808 one or more progress codes for the various data copies and the corresponding data stripes 506. The map module 408 then maps 810 the data stripes 506 to the corresponding persistent storage devices. The pre-copy method 800 then ends.

Figure 9:
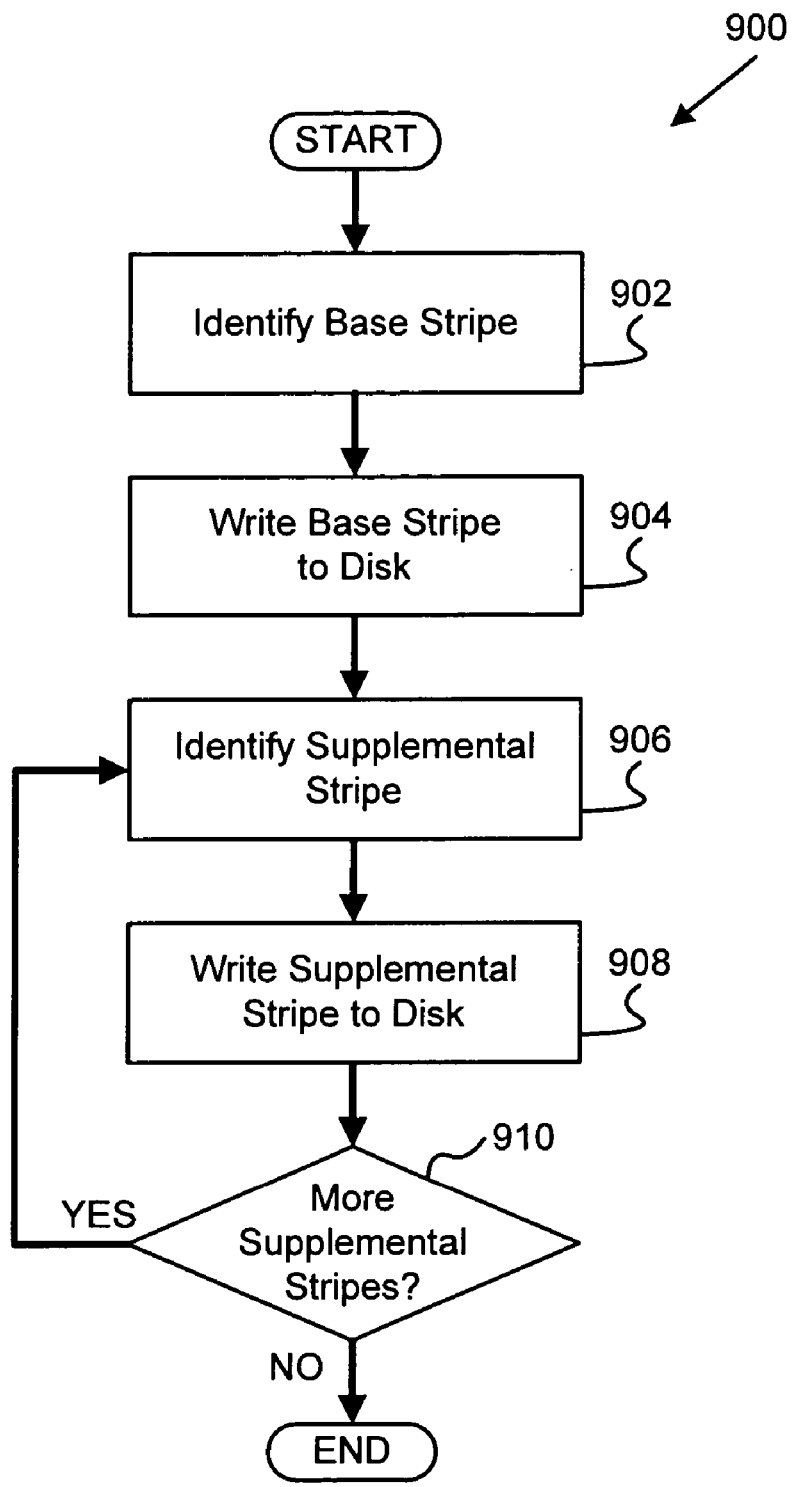
FIG. 9 is a schematic flow chart diagram illustrating one embodiment of a parallel write method.

FIG. 9 depicts one embodiment of a parallel write method 900 that is given by way of example of more detailed operations that may occur in conjunction with the copy method 700 of FIG. 7. In particular, the parallel write method 900 describes one example of writing the various data stripes 506 in parallel to the corresponding persistent storage devices. In one embodiment, the parallel write method 900 begins in response to completion of the pre-copy method 800 of FIG. 8.

After the parallel write method 900 begins, the base module 416 identifies 902 the base stripe for each data copy. For example, if the data image 502 is subdivided into three data stripes 506, then the base module 416 may identify each of the three data stripes 506 as corresponding to each of three data copies. The write module 406 then writes 904 in parallel the base stripes 506 to the corresponding persistent storage devices. In one embodiment, the write operation 904 may occur on a single processor, via multiple processors, through management of processor threads, or by any other means that carries out substantially parallel operations.

After the base stripes for each of the data copies are written 904 to the corresponding persistent storage devices, the supplemental module 418 then identifies 906 the first supplemental stripes. The write module 406 then writes 908 the supplemental stripes to the corresponding persistent storage devices. The supplemental module 418 then determines 910 if there are additional supplemental stripes and, if so returns to identify 906 the additional supplemental stripes. The identification operation 906, writing operation 908, and determination operation 910 continue in this manner until all of the supplemental stripes are written 908 to persistent data storage devices. The parallel write method 900 then ends. Alternatively, the parallel write method 900 ends upon failure of the secondary power to the storage controller 200.

Figure 10:
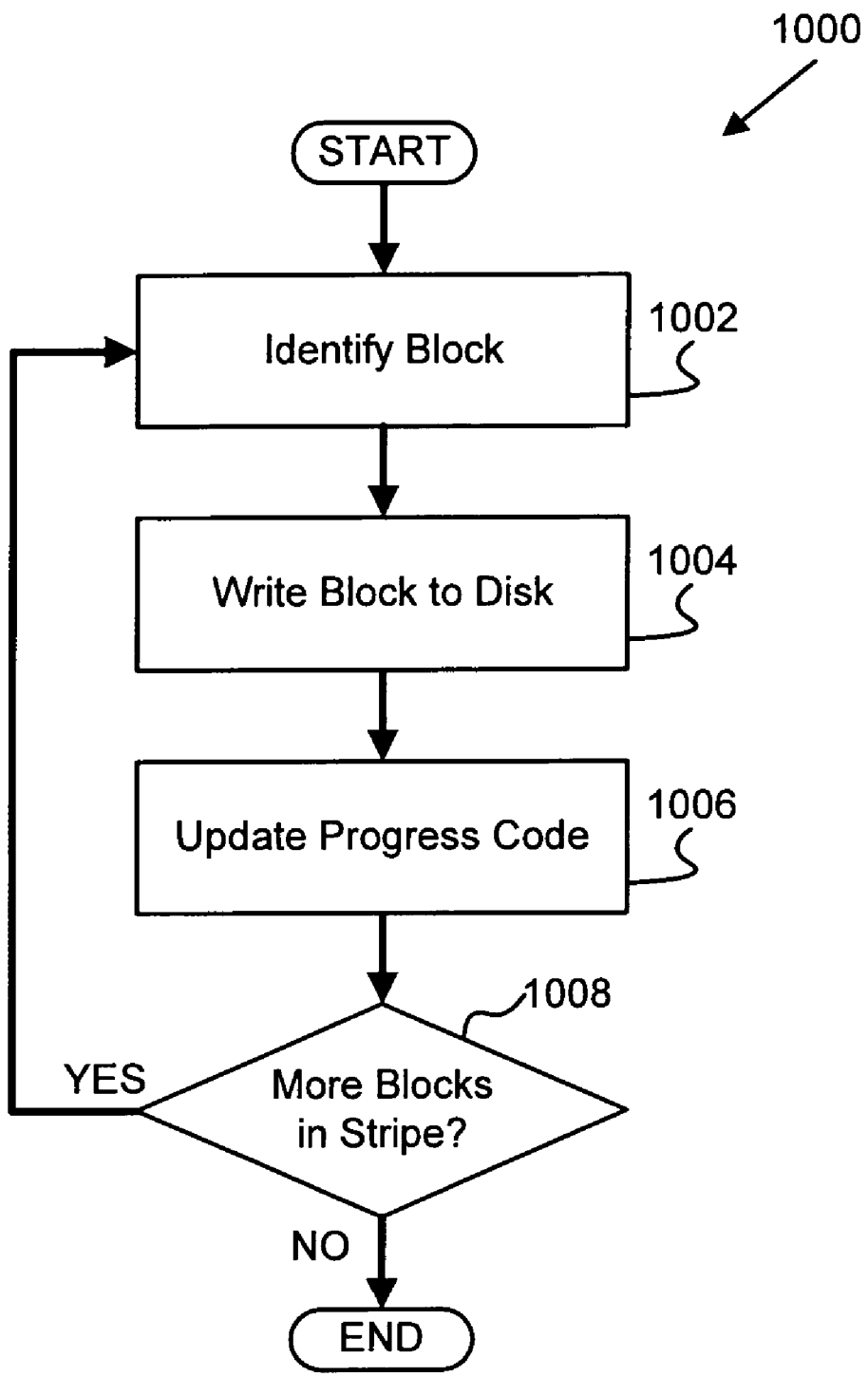
FIG. 10 is a schematic flow chart diagram illustrating one embodiment of a stripe write method.

FIG. 10 depicts one embodiment of a stripe write method 1000 that is given by way of example of more detailed operations that may occur in conjunction with the copy method 700 of FIG. 7. In particular, the stripe write method 1000 shows operations that may facilitate either a forward write or a backward write for a given data stripe 506. In one embodiment, the stripe write method 1000 begins in response to initiation of the stripe write operations 904, 908 of the parallel write method 900 of FIG. 9.

The illustrated stripe write method 900 begins and the write module 406 identifies 1002 a data block 504 within the data stripe 506. More specifically, in a forward write operation, the forward module 422 identifies 1002 the first data block 504 of the data stripe 506. In contrast, in a backward write operation, the backward module 424 identifies 1002 the last data block 504 of the data strip 506. The write module 406 then writes 1004 the identified 1002 block to persistent storage. In conjunction with the write operation 1004, the progress module 410 may update the associated progress code(s).

The write module 406 then determines 1008 if additional data blocks 504 within the given data stripe 506 are to be written. If so, the write module 406 proceeds to identify 1002 the next data block 504. Alternatively, if all of the data blocks 504 for a given data stripe 506 have been written, the depicted stripe write method 1000 then ends.

Figure 11:
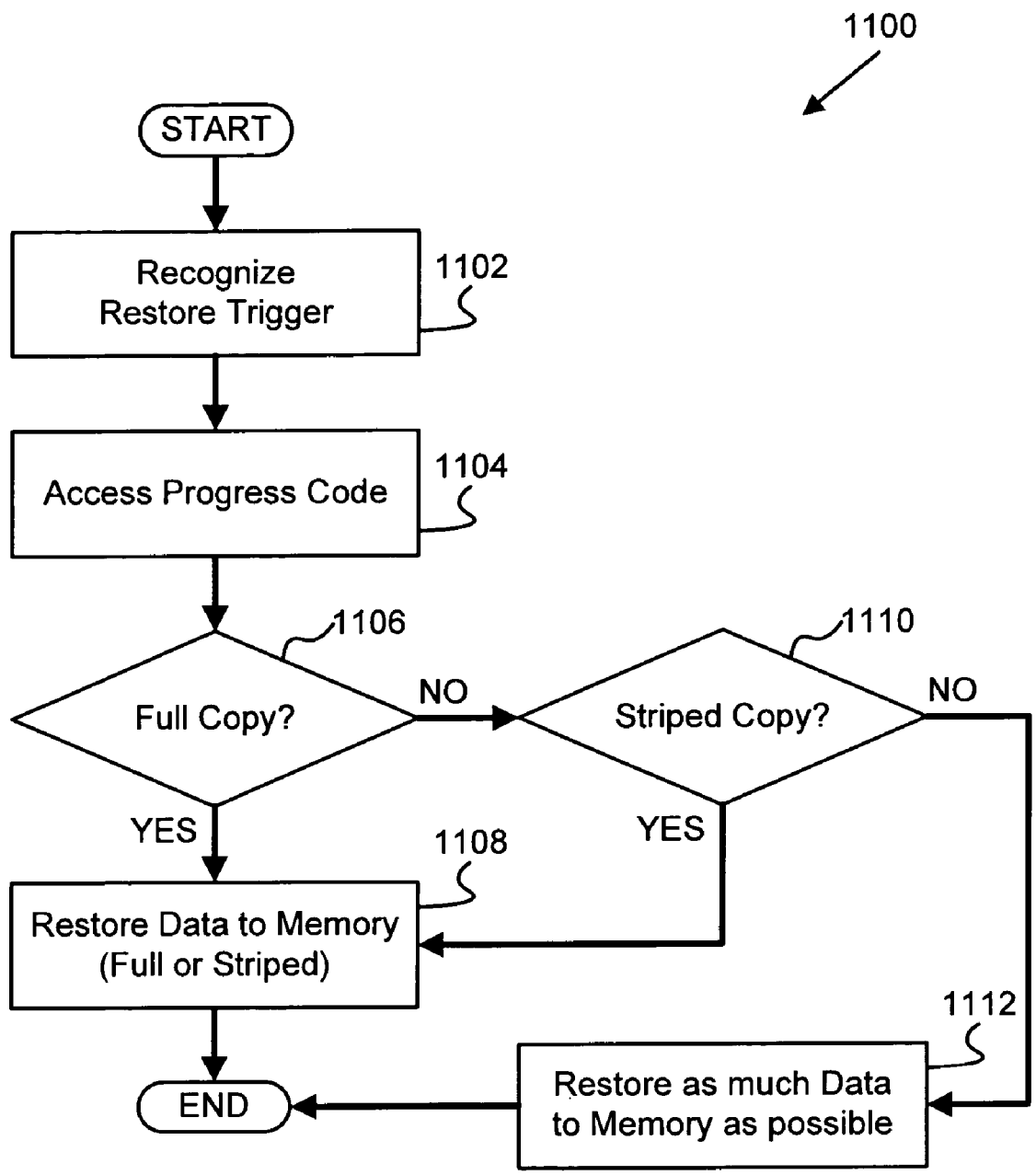
FIG. 11 is a schematic flow chart diagram illustrating one embodiment of a restore method.

FIG. 11 depicts one embodiment of a restore method 1100 that may facilitate restoring a data image 500 from a persistent storage device to the write cache 308. In one embodiment, the restore method 1100 may being in response recognition 1102 of a trigger event, such as regaining power at the storage controller 200 after a prior loss of line power at the storage controller 200. However, other events also may serve as trigger events for the restore method 1100.

After the illustrated restore method 1100 begins, the progress module 410 may access 1104 the progress code(s) to determine 1106 if a full data copy of the data image 500 exists on a single persistent storage device. If so, the restore module 414 restores 1108 the data image 500 to the write cache 308. Alternatively, the restore module 414 may restore 1108 the data image 500 to the read cache 306. In a further embodiment, the restore module 414 may restore 1108 the data image 500 from multiple data stripes 506 over a plurality of persistent storage devices.

If the progress module 410 determines 1106 that a full copy of the data image 500 does not exist on a single persistent storage device, the progress module 410 subsequently determines 1110 if a striped copy exists over a plurality of persistent storage devices. If such a striped copy exists, even though a full copy does not exist on any single persistent storage device, the restore module 414 restores 1108 the striped copy from the plurality of persistent storage devices. In one embodiment, the restore module 414 restores 1108 the striped copy in substantially the same order in which the data stripes were written from the write cache 308 to the plurality of data storage devices.

If, however, there is not a full copy or a striped copy of the data image 500, the restore module 414 attempts to restore 1112 as much of the data image 500 as possible. In one embodiment, the restore module 414 may employ conventional data recovery technologies to attempt to restore 1112 the partial data to the write cache 308. After the restore module 414 restores the full copy, the striped copy, or as much of the partial data as possible, the depicted restore method 1100 then ends.

Hence, it may be advantageous to provide a copy apparatus 400 that facilitates a parallel stripe write operation to dump as much write data 330 as possible from the write cache 308 to persistent storage. In one particular application, this relatively fast data copy operation facilitates copying as much data from volatile memory 300 to persistent storage devices in response to a loss of line power to a power controller 200. Advantageously, the speed of the timed copy operation decreases reliance on long batteries to back up the entire storage subsystem 106 for extended periods of time. Additionally, the restore module 414 facilitates restoring the data image 500, if necessary, to the write cache 308 in an approximately equally quick time period.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to copy data, the apparatus comprising:
   a storage device storing executable code;
   a processor executing the executable code, the executable code comprising
   a section module sectioning a data image of a write cache into a plurality of data blocks;
   a stripe module coupled to the section module, the stripe module establishing a plurality of data stripes from the plurality of data blocks; and
   a write module coupled to the stripe module, the write module writing in parallel each of the plurality of data stripes to a corresponding plurality of unique, persistent data storage devices, writing all of the data stripes to each of the data storage devices to produce a plurality of data copies equal to the number of data stripes, in response to a loss of line power to the write cache.

2. The apparatus of claim 1, the executable code further comprising a base module coupled to the write module, the base module designating one of the data stripes as a base stripe associated with a corresponding data copy.

3. The apparatus of claim 2, the executable code further comprising a supplemental module coupled to the write module, the supplemental module designating all of the data stripes, except for the base stripe, as supplemental stripes for the data copy corresponding to the base stripe.

4. The apparatus of claim 3, the write module further writing the base stripe and, subsequently, the supplemental stripes to one of the unique data storage devices.

5. The apparatus of claim 1, the executable code further comprising a map module coupled to the write module, the map module mapping the data image to each of the plurality of data storage devices.

6. The apparatus of claim 1, the executable code further comprising a progress module coupled to the write module, the progress module managing a progress code to track progress of the parallel data stripe write.

7. The apparatus of claim 1, the executable code further comprising a forward module coupled to the write module, the forward module writing one of the plurality of data stripes to one of the plurality of data storage devices in a forward direction.

8. The apparatus of claim 1, the executable code further comprising a backward module coupled to the write module, the backward module writing one of the plurality of data stripes to one of the plurality of data storage devices in a backward direction.

9. The apparatus of claim 1, the executable code further comprising a trigger module coupled to the write module, the trigger module recognizing the loss of line power to the write cache.

10. The apparatus of claim 1, the executable code further comprising a restore module coupled to the write module, the restore module reading the data stripes from the plurality of data storage devices and to restore the write data to the write cache.

11. The apparatus of claim 1, wherein each of the data stripes comprises a unique subset of the plurality of data blocks.

12. A system to copy data, the system comprising:
    a plurality of data storage devices;
    a storage controller coupled to the plurality of data storage devices;
    a write cache coupled to the storage controller, the write cache storing write data; and
    a copy apparatus coupled to the storage controller, the copy apparatus comprising a storage device storing executable code and a processor executing the executable code, the executable code performing operations comprising writing a plurality of copies of the write data in parallel to the plurality of data storage devices, writing all of the copies to each of the data storage devices to produce a plurality of data copies equal to the number of copies, in response to a loss of power to the storage controller, each copy written in a unique striped order with respect to the other copies.

13. The system of claim 12, the executable code further comprising a progress module, the progress module managing a progress code to track progress of the parallel copy write.

14. The system of claim 12, the progress module further storing the progress code in a persistent storage device coupled to the storage controller.

15. The system of claim 14, the executable code further comprising a restore module, the restore module reading at least one of the copies from the plurality of data storage devices and restoring the write data to the write cache.

16. The system of claim 15, the restore module further restoring the write data to the write cache in the same order in which the plurality of copies are written to the plurality of data storage devices.

17. A storage device storing executable code executed by a processor to perform operations to copy data, the operations comprising:
- sectioning a data image of a write cache into a plurality of data blocks;
- establishing a plurality of data stripes from the plurality of data blocks; and
- writing in parallel each of the plurality of data stripes to a corresponding plurality of unique, persistent data storage devices, writing all of the data stripes to each of the data storage devices to produce a plurality of data copies equal to the number of data stripes, in response to a loss of line power to the write cache.

18. The storage device of claim 17, further comprising an operation to designate one of the data stripes as a base stripe associated with a corresponding data copy.

19. The storage device of claim 18, further comprising an operation to designate all of the data stripes, except for the base stripe, as supplemental stripes for the data copy corresponding to the base stripe.

20. The storage device of claim 19, further comprising an operation to write the base stripe and, subsequently, the supplemental stripes to one of the unique data storage devices.

21. The storage device of claim 17, further comprising an operation to map the data image to each of the plurality of data storage devices.

22. The storage device of claim 17, further comprising an operation to manage a progress code to track progress of the parallel data stripe write.

23. The storage device of claim 17, further comprising an operation to write one of the plurality of data stripes to one of the plurality of data storage devices in a forward direction.

24. The storage device of claim 17, further comprising an operation to write one of the plurality of data stripes to one of the plurality of data storage devices in a backward direction.

25. The storage device of claim 17, further comprising an operation to recognize the loss of line power to the write cache.

26. The storage device of claim 17, further comprising an operation to read the data stripes from the plurality of data storage devices and to restore the write data to the write cache.

27. A method for deploying computer infrastructure, comprising integrating a storage device storing computer-readable code into a computing system, wherein the code in combination with the computing system is capable of copying data by performing the following:
- sectioning a data image of a write cache into a plurality of data blocks;
- establishing a plurality of data stripes from the plurality of data blocks; and
- writing in parallel each of the plurality of data stripes to a corresponding plurality of unique, persistent data storage devices, writing all of the data stripes to each of the data storage devices to produce a plurality of data copies equal to the number of data stripes, in response to a loss of line power to the write cache.

28. The method of claim 27, wherein the code in combination with the computing system is further capable of mapping the data image to each of the plurality of data storage devices.

29. The method of claim 27, wherein the code in combination with the computing system is further capable of managing a progress code to track progress of the parallel data stripe write.

30. The method of claim 27, wherein the code in combination with the computing system is further capable of reading the data stripes from the plurality of data storage devices and restoring the write data to the write cache.

31. An apparatus to copy data, the apparatus comprising:
- a storage device storing executable code;
- a processor executing the executable code, the executable code comprising
  - means for sectioning a data image of a write cache into a plurality of data blocks;
  - means for establishing a plurality of data stripes from the plurality of data blocks; and
  - means for writing in parallel each of the plurality of data stripes to a corresponding plurality of unique, persistent data storage devices, writing all of the data stripes to each of the data storage devices to produce a plurality of data copies equal to the number of data stripes, in response to a loss of line power to the write cache.

32. The apparatus of claim 31, the executable code further comprising means for writing a first of the plurality of data stripes to a first of the plurality and data storage devices in a forward direction and writing a second of the plurality of data stripes to a second of the plurality of data storage devices in a backward direction.

33. The apparatus of claim 31, the executable code further comprising means for restoring the write data to the write cache in response to a regain of line power to the write cache.

* * * * *